US007038798B2

(12) United States Patent
Kobayashi

(10) Patent No.: US 7,038,798 B2
(45) Date of Patent: May 2, 2006

(54) METHOD AND APPARATUS FOR MULTI-FUNCTION PROCESSING CAPABLE OF PERFORMING A PROGRAM DOWNLOADING USING A COMMON SINGLE CONNECTION, AND A MEDIUM STORING THE METHOD

(75) Inventor: Kazunori Kobayashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 813 days.

(21) Appl. No.: 09/844,630

(22) Filed: May 1, 2001

(65) Prior Publication Data

US 2002/0004870 A1   Jan. 10, 2002

(30) Foreign Application Priority Data

May 1, 2000  (JP)  .............................. 2000-132712

(51) Int. Cl.
*G06F 15/00* (2006.01)
(52) U.S. Cl. .................... 358/1.15; 358/1.14; 358/296
(58) Field of Classification Search ................. 358/1.1, 358/1.5, 1.12, 1.13, 1.14, 1.15, 296
See application file for complete search history.

(56) References Cited

U.S. PATENT DOCUMENTS

| 5,440,632 A | 8/1995 | Bacon et al. |
| 5,459,579 A * | 10/1995 | Hu et al. ..................... 358/296 |
| 5,590,373 A | 12/1996 | Whitley et al. |
| 5,768,483 A * | 6/1998 | Maniwa et al. ............ 358/1.15 |
| 5,822,692 A | 10/1998 | Krishan et al. |

FOREIGN PATENT DOCUMENTS

WO      WO 96/02034      1/1996

OTHER PUBLICATIONS

Patent Abstracts of Japan, JP 11-272634, Oct. 8, 1999.
Xi Dian University Publishing House, http:// www.xduph.com, pp. 1-4, 233-234, 266-267, and 414, "Microcomputer Principle and Application (VER. 2)", Dec. 1999 ( with partial English translation).

* cited by examiner

*Primary Examiner*—Mark Wallerson
(74) *Attorney, Agent, or Firm*—Oblon, Spivak, McClelland, Maier & Neustadt, P.C.

(57) ABSTRACT

A multi-function apparatus includes a plurality of image forming apparatuses, a buffer memory, a data transmission mechanism, and a connector. Each image forming apparatus includes a controller which includes a program memory for storing a program used by the image forming apparatus. The data transmission mechanism connects the image forming apparatuses to each other so as to allow a data transmission therebetween. The connector connects an external storage to the data transmission mechanism so as to allow a data transmission from the external storage to the buffer memory. The external storage stores data of programs to be respectively used by the image forming apparatuses. When the external storage is connected to the connector, the data of the programs stored in the external storage are transmitted to the buffer memory through the connector and are downloaded into the respective program memories included in the controllers of the image forming apparatuses through a data transmission using the data transmission mechanism.

23 Claims, 7 Drawing Sheets

METHOD AND APPARATUS FOR MULTI-FUNCTION PROCESSING CAPABLE OF PERFORMING A PROGRAM DOWNLOADING USING A COMMON SINGLE CONNECTION, AND A MEDIUM STORING THE METHOD

BACKGROUND

1. Field

The present application relates to a method and apparatus for multi-function processing, and more particularly to a method and apparatus for multi-function processing capable of performing a program downloading using a common single connection. The present application further relates to a computer readable medium for storing the above-mentioned method.

2. Description of the Related Arts

An image forming apparatus, such as a copying machine, a facsimile machine, a printer, a scanner, an electronic filing apparatus, etc., or a combination apparatus of these machines, performs an image processing operation according to a program provided to a control unit of the apparatus.

Since the above program is typically stored in an EPROM (erasable programmable read only memory) provided to the apparatus, it is needed to exchange the EPROM each time the program is changed.

In order to reduce time required for the exchange of the EPROM, programs are recently stored in a flash ROM which can be updated by a downloading of a new program from an external storage including an IC (integrated circuit) card. Thereby, the time for exchanging the program in the apparatus is dramatically shortened. In this method, the IC card, for example, is substituted for the flash ROM, that is, addresses of the flash ROM and the IC card are exchanged on a memory map, and therefore the apparatus is started with the program stored in the IC card. Thereby, the apparatus can download a new program stored in the IC card to the flash ROM.

This download method is significant especially for a recent digital multi-function apparatus which is mostly based on a digital copying machine and has a plurality of components for image forming, such as a printer, a facsimile, a scanner, etc., wherein each of the components is provided with a dedicated CPU and ROMs.

One example of the above background digital multi-function apparatus is explained with reference to FIGS. 1 and 2. FIG. 1 shows a digital multi-function apparatus 5 based on a digital copying apparatus 6 having a main controller 100 and which has optional devices of a printer controller 200 and a facsimile controller 300. In this background digital multi-function apparatus 5, a CPU (central processing unit) 101 included in the main controller 100 controls the entire operations.

The background digital multi-function apparatus 5 performs a copying operation in which image data output from a reading controller 400 after an original is read by a reading unit (not shown) is sent to a writing controller 500 via an image controller 106. The writing controller 500 controls an LD (laser diode), not shown, to turn on and off according to the image data and forms an image on a transfer sheet based on a known electrophotographic procedure (not shown).

Each of the printer controller 200 and the facsimile controller 300 is connected to the digital copying apparatus 6 with a UART (Universal Asynchronous Receiver Transmitter) serving as a data transmitting configuration and an application image data bus serving as a data bus for sending data of an application image.

During a print operation, the printer controller 200 receives print data sent through a network with a network interface mechanism (not shown) and sends a print image generated by an image controller 206 based on the print data to the digital copying apparatus 6 so as to perform an image forming operation. This operation is performed by an execution of a printer application program by a CPU (central processing unit) 201 with an assistance of a ROM (read only memory) 202 and a RAM (random access memory) 203, included in the printer controller 200.

During a facsimile operation, the facsimile controller 300 transmits a facsimile image, generated and sent to the facsimile controller 300 by the digital copying apparatus 6, to a facsimile line with a facsimile line interface (not shown), or receives a facsimile signal from the facsimile line via the facsimile line interface and sends it to the digital copying apparatus 6 so as to perform the image forming operation. This operation is performed by an execution of a facsimile application program by a CPU (central processing unit) 301 with an assistance of a ROM (read only memory) 302 and a RAM (random access memory) 303, included in the facsimile controller 300.

In the above operations, the digital copying apparatus 6 exchanges with the printer controller 200 and the facsimile controller 300 control data through UARTs (Universal Asynchronous Receiver Transmitter) 104, 204, and 304 and image data through the application image data bus connecting image controllers 106, 206, and 306 to each other so that the background digital multi-function apparatus 5 can perform a sequential operation under a multi-function operating system.

The main controller 100 is provided with a ROM (read only memory) 102 that stores a plurality of programs including a program used by the CPU 101 which governs the entire operations of the background digital multi-function apparatus 5. To update the programs, as described above, an IC (integrated circuit) card 107, serving as an external storage device and which stores a latest program, is connected to an IC (integrated circuit) card connector 105 and the program is downloaded to the ROM 102 via a CPU bus.

FIG. 2 shows a procedure of the program downloading performed by the background digital multi-function apparatus 5. After the IC card 107 is inserted into the IC card connector 105 in Step S701, the background digital multi-function apparatus 5 is given power in Step S702 and then a download program stored in the IC card 107 is initiated in Step S703. Thereby, the downloading program is started in Step S704.

In Step S704, the contents of the IC card 107 are sequentially transmitted to the ROM 102 via the CPU bus. Whether the transmission of the program is completed is checked in Step S706. If the transmission is determined as completed in Step S706, a process for completing the program downloading is performed in Step S707. Then, the process ends.

Likewise, the printer controller 200 performs an application operation according to the program stored in the ROM 202. To update the program, IC (integrated circuit) card 207 is connected to IC (integrated circuit) card connector 205 and the program stored in the IC card 207 is downloaded to the ROM 202. Also, the facsimile controller 300 performs an application operation according to the program stored in the ROM 302. To update the program, IC (integrated circuit) card 307 is connected to IC (integrated circuit) card connector 305 and the program stored in the IC card 307 is downloaded to the ROM 302.

However, the background digital multi-function apparatus 5 needs to have more than one mechanism for receiving the IC card and transmitting the contents of the IC card. This results in an increase of the manufacturing cost.

SUMMARY

The present application describes a novel multi-function apparatus. In one example, a novel multi-function apparatus includes a plurality of image forming apparatuses, a buffer memory, a data transmission mechanism, and a connector. Each of the image forming apparatuses includes a controller which includes a program memory for storing a program used by the image forming apparatus. The data transmission mechanism is configured to connect the plurality of image forming apparatuses to each other so as to allow a data transmission therebetween. The connector is configured to connect an external storage to the data transmission mechanism so as to allow a data transmission from the external storage to the buffer memory. The external storage stores data of programs to be respectively used by the plurality of image forming apparatuses. When the external storage is connected to the connector, the data of the programs stored in the external storage are transmitted to the buffer memory through the connector and are downloaded into the respective program memories included in the controllers of the plurality of image forming apparatuses through a data transmission using the data transmission mechanism.

The data transmission mechanism may include a communications mechanism which is normally used by the plurality of image forming apparatuses to exchange control data therebetween.

The data of the programs transmitted from the external storage to the buffer memory may be downloaded with the communications mechanism to the respective program memories included in the controllers of the plurality of image forming apparatuses at a transmission rate faster than a regular transmission rate used for the control data.

The communications mechanism may be a universal asynchronous receiver transmitter.

The data transmission mechanism may include an image data bus which is normally used by the plurality of image forming apparatuses to exchange image data therebetween.

The present application further describes a novel program downloading method. In one example, a novel program downloading method includes the steps of providing, connecting, transmitting, and downloading. The providing step provides a multi-function apparatus which includes a buffer memory, a connector, and a plurality of image forming apparatuses connected each other with a data transmission mechanism. Each of the plurality of image forming apparatuses include a controller provided with a program memory for storing a program used by the image forming apparatus. The connecting step connects an external storage storing data of programs to the connector. The transmitting step transmits the data of programs stored in the external storage into the buffer memory. The downloading step downloads the data of the programs, transmitted from the external storage to the buffer memory, respectively included in the program memories of the controllers respectively included in the plurality of image forming apparatuses through a data transmission using the data transmission mechanism.

The data transmission mechanism may include a communications mechanism which is normally used by the plurality of image forming apparatuses to transmit control data therebetween and the downloading step uses the communications mechanism.

The downloading step may download the data of the programs, transmitted from the external storage to the buffer memory by the transmitting step, with the communications mechanism to the respective program memories of the controllers respectively included in the plurality of image forming apparatuses at a transmission rate faster than a regular transmission rate used for the control data.

The communications mechanism may be a universal asynchronous receiver transmitter.

The data transmission mechanism may include an image data bus which is normally used by the plurality of image forming apparatuses to exchange image data therebetween.

Further, the present application describes a computer readable medium storing computer instructions for performing the steps described in the above novel program downloading method.

BRIEF DESCRIPTION OF THE DRAWINGS

A more complete appreciation of the present application and many of the attendant advantages thereof will be readily obtained as the same becomes better understood by reference to the following detailed description when considered in connection with the accompanying drawings, wherein.

DETAILED DESCRIPTION

Figure 1:
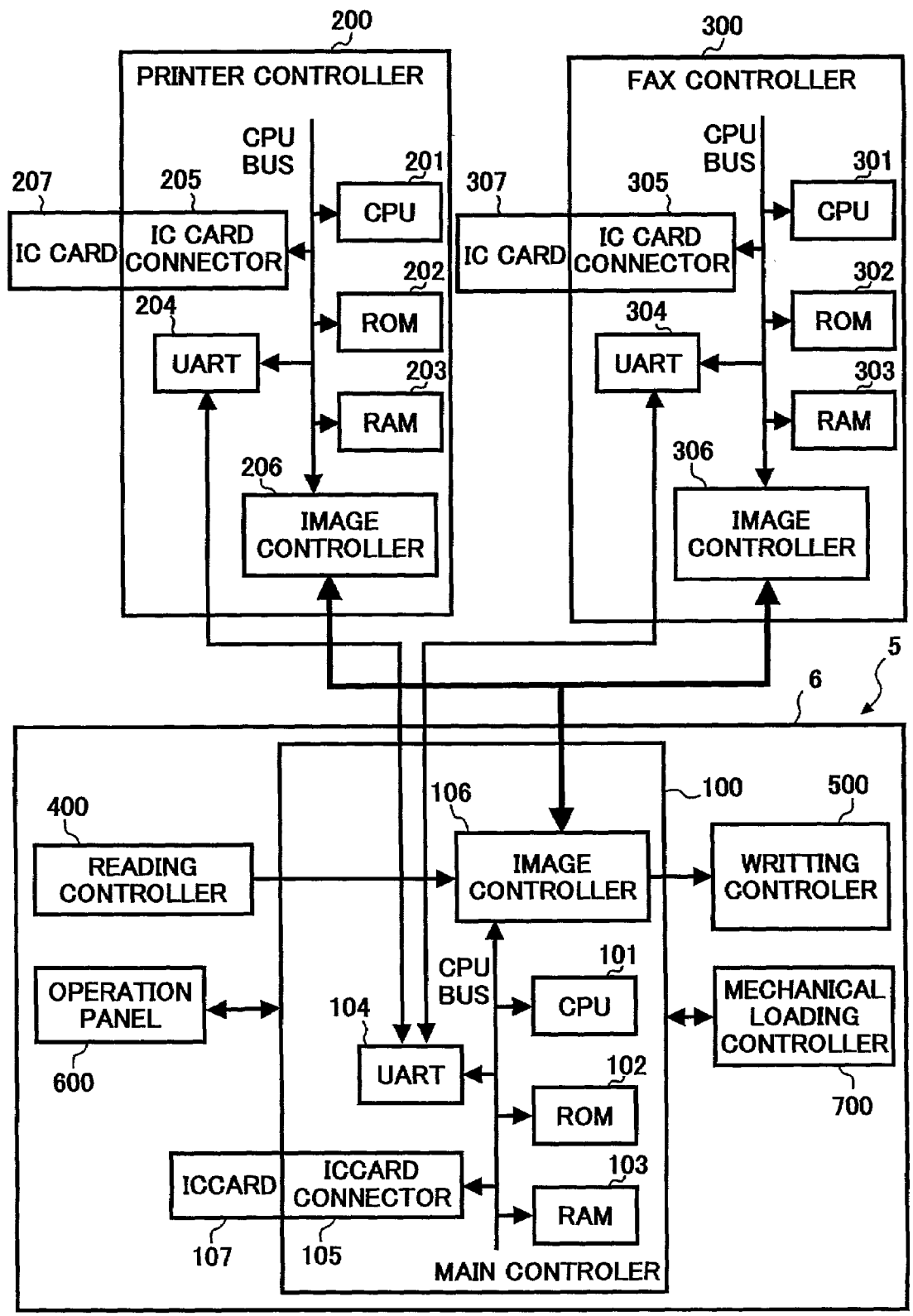
FIG. 1 is a block diagram of a background digital multi-function apparatus.
Figure 2:
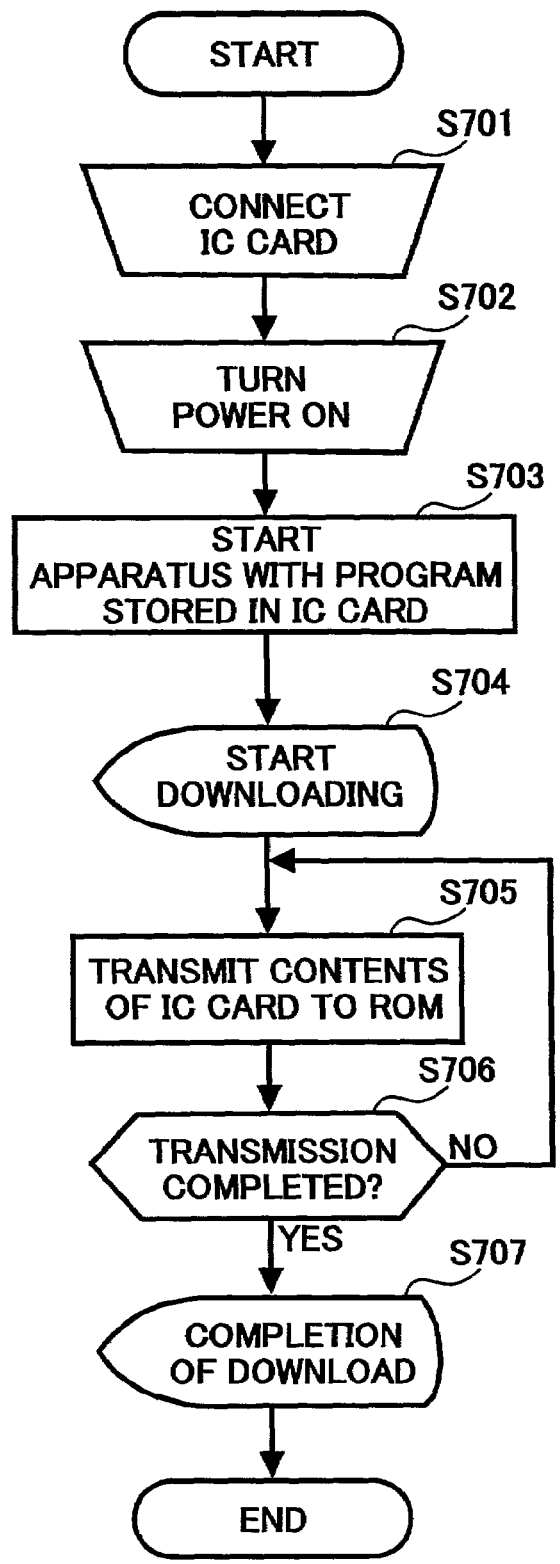
FIG. 2 is a flowchart for explaining a procedure of a program downloading performed by the background digital multi-function apparatus of FIG. 1.

In describing preferred embodiments illustrated in the drawings, specific terminology is employed for the sake of clarity. However, the invention is not intended to be limited to the specific terminology so selected and it is to be understood that each specific element includes all technical equivalents which operate in a similar manner.

Figure 3:
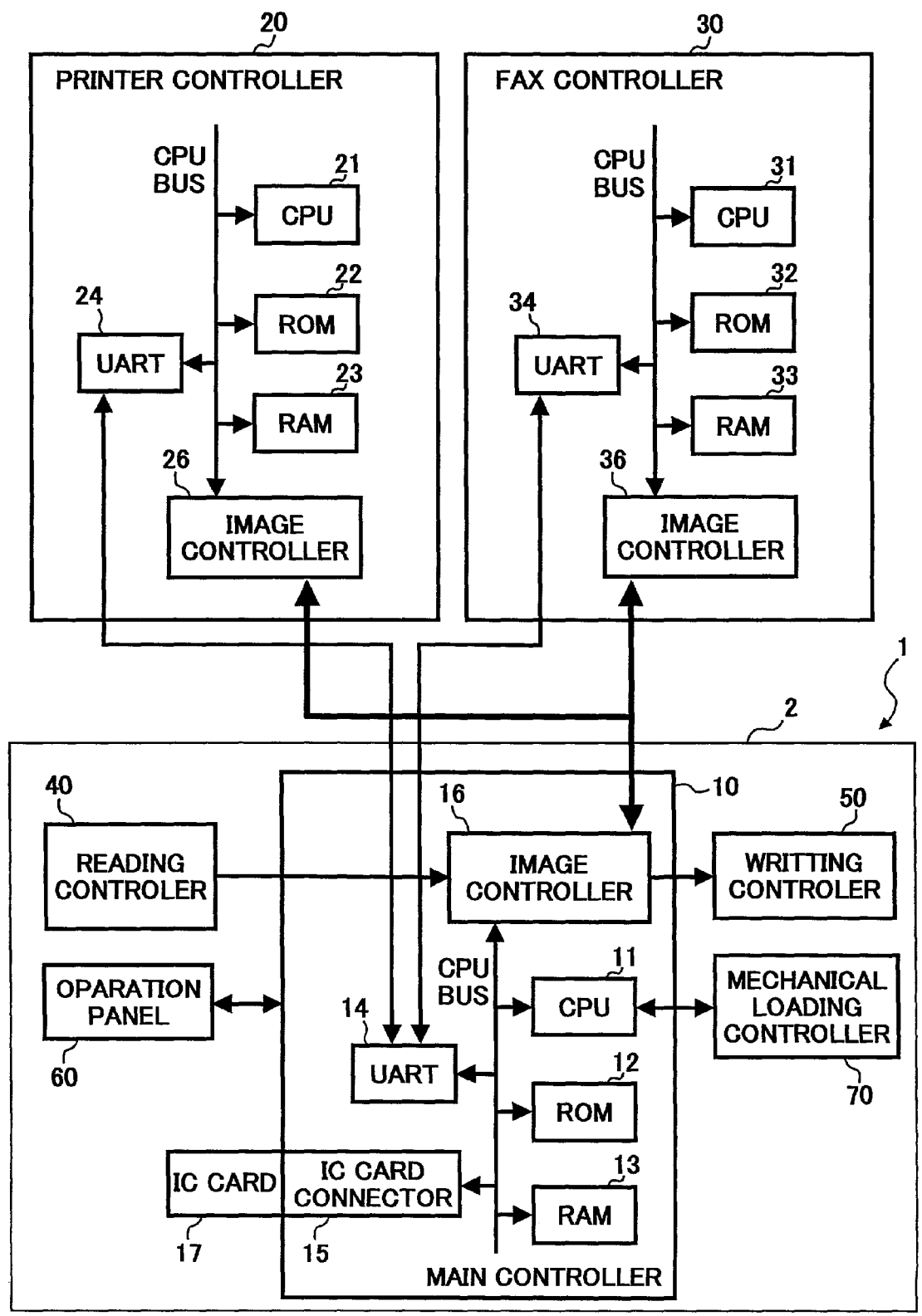
FIG. 3 is a block diagram of a digital multi-function apparatus according to a preferred embodiment.

Referring now to the drawings, wherein like reference numeral designate identical or corresponding parts throughout the several views, particularly to FIG. 3, a digital multi-function apparatus 1 as one example of a multi-function image forming system according to an embodiment of the present application is described. FIG. 3 shows a block diagram of a main part of the digital multi-function apparatus 1 that includes a digital copying apparatus 2, as a basic machine, and optional equipment installed on the basic machine, including a printer controller 20 and a facsimile controller 30. The digital copying apparatus 2 includes a main controller 10 which is provided with a CPU (central processing unit) 11 that controls the entire operations of the digital multi-function apparatus 1.

The digital multi-function apparatus 1 performs a copying operation in which image data output from a reading controller 40 after an original is read by a reading unit (not shown) is sent to a writing controller 50 via an image controller 16. The writing controller 50 controls an LD (laser diode), not shown, to turn on and off according to the image data and forms an image on a transfer sheet based on a known electrophotographic procedure (not shown).

Each of the printer controller 20 and the facsimile controller 30 is connected to the digital copying apparatus 2 with a UART (Universal Asynchronous Receiver Transmitter) serving as a data transmitting configuration and an application image data bus serving as a data bus for sending data of an application image.

During a print operation, the printer controller 20 receives print data sent through a network with a network interface mechanism (not shown) and sends a print image generated by an image controller 26 based on the print data to the digital copying apparatus 2 so as to perform an image forming operation. This operation is performed by an execution of a printer application program by a CPU (central processing unit) 21 included in the printer controller 20.

During a facsimile operation, the facsimile controller 30 transmits a facsimile image, generated and sent to the facsimile controller 30 by the digital copying apparatus 2, to a facsimile line with a facsimile line interface (not shown), or receives a facsimile signal from the facsimile line via the facsimile line interface and sends it to the digital copying apparatus 2 so as to perform the image forming operation. This operation is performed by an execution of a facsimile application program by a CPU (central processing unit) 31 included in the facsimile controller 30.

In the above operations, the digital copying apparatus 2 exchanges with the printer controller 20 and the facsimile controller 30 control data through UARTs (Universal Asynchronous Receiver Transmitter) 14, 24, and 34 and image data through the application image data bus connecting image controllers 16, 26, and 36 to each other so that the digital multi-function apparatus 1 can perform a sequential operation under a multi-function operating system.

The main controller 10 is provided with a ROM (read only memory) 12 that stores a plurality of programs including a program used by the CPU 11 which governs the entire operations of the digital multi-function apparatus 1. To update the programs, an IC (integrated circuit) card 17, serving as an external storage device and which stores a latest program, is connected to an IC (integrated circuit) card connector 15 and the program is downloaded to the ROM 12 via a CPU bus.

Likewise, the printer controller 20 and the facsimile controller 30 are provided with ROMs (read only memories) 22 and 32, respectively, which govern the operations of the respective units. To update the programs for these optional devices, the IC card 17 which also stores latest programs for the optional devices is connected to the IC card connector 15 and the respective programs are downloaded to the ROM 22 and 32 via the CPU bus and the UARTs.

Thus, downloading of the programs to the respective memory devices can be performed through a single common connector, the IC card connector 15. Thereby, a number of connectors can be minimized.

Figure 4:
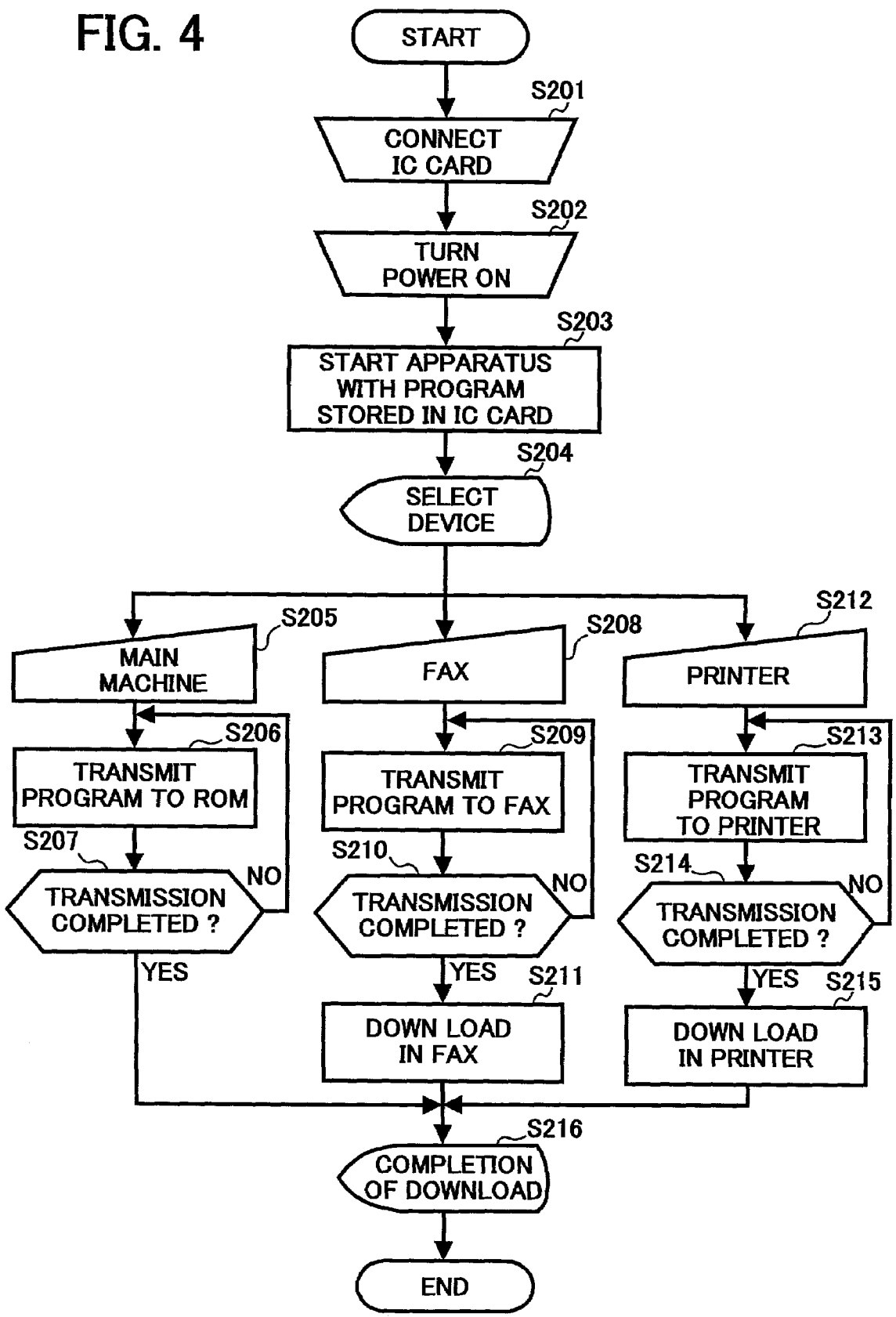
FIG. 4 is a flowchart for explaining an exemplary procedure of the program downloading with a single IC card connector.

Referring to FIG. 4, an operation for downloading programs to the digital copying apparatus 2 and the optional devices through the IC card connector 15 is explained. After the IC card 17 is inserted into the IC card connector 15 in Step S201, the digital multi-function apparatus 1 is given power in Step S202 and then a download program stored in the IC card 17 is initiated in Step S203.

In Step S204, one of the optional devices is selected so that the program is downloaded to the device selected. An instruction for this selection may be provided inside the IC card 17 or through an operation panel 60 of the digital copying apparatus 2.

When the digital copying apparatus 2 is selected as the device for the downloading in Step S204, the process proceeds to Step S205 and the contents of the IC card 17 is sequentially transmitted to the ROM 12 via the CPU bus in Step S206. Whether the transmission of the program is completed is checked in Step S207. If the transmission is determined as completed in Step S207, a process for completing the program downloading is performed in Step S216. Then, the process ends.

When the facsimile controller 30 is selected as the device for downloading in Step S204, the process proceeds to Step S208. Then, in Step S209, the contents of the IC card 17 is transmitted to and is temporarily stored in a storage of the main controller 10, including a RAM (random access memory) 13, via the CPU bus and the program temporarily stored is transmitted to a memory for temporarily storing facsimile transmission data held within the facsimile controller 30 via a data transmission configuration connecting the main controller 10 and the facsimile controller 30 each other. Whether the transmission of the program is completed is checked in Step S210. If the transmission is determined as completed in Step S210, the program temporarily stored in the memory within the facsimile controller 30 is downloaded to a ROM (read only memory) 32 in Step S211 and a process for completing the program downloading is performed in Step S216. Then, the process ends.

Likewise, when the printer controller 20 is selected as the device for downloading in Step S204, the process proceeds to Step S212. Then, in Step S213, the contents of the IC card 17 is transmitted to and is temporarily stored in a storage of the main controller 10, including the RAM (random access memory) 13, via the CPU bus and the program temporarily stored is transmitted to a memory for temporarily storing printer transmission data held within the printer controller 20 via a data transmission configuration connecting the main controller 10 and the printer controller 20 each other. Whether the transmission of the program is completed is checked in Step S214. If the transmission is determined as completed in Step S214, the program temporarily stored in the memory within the printer controller 20 is downloaded to a ROM (read only memory) 22 in Step S215 and a process for completing the program downloading is performed in Step S216. Then, the process ends.

Figure 5:
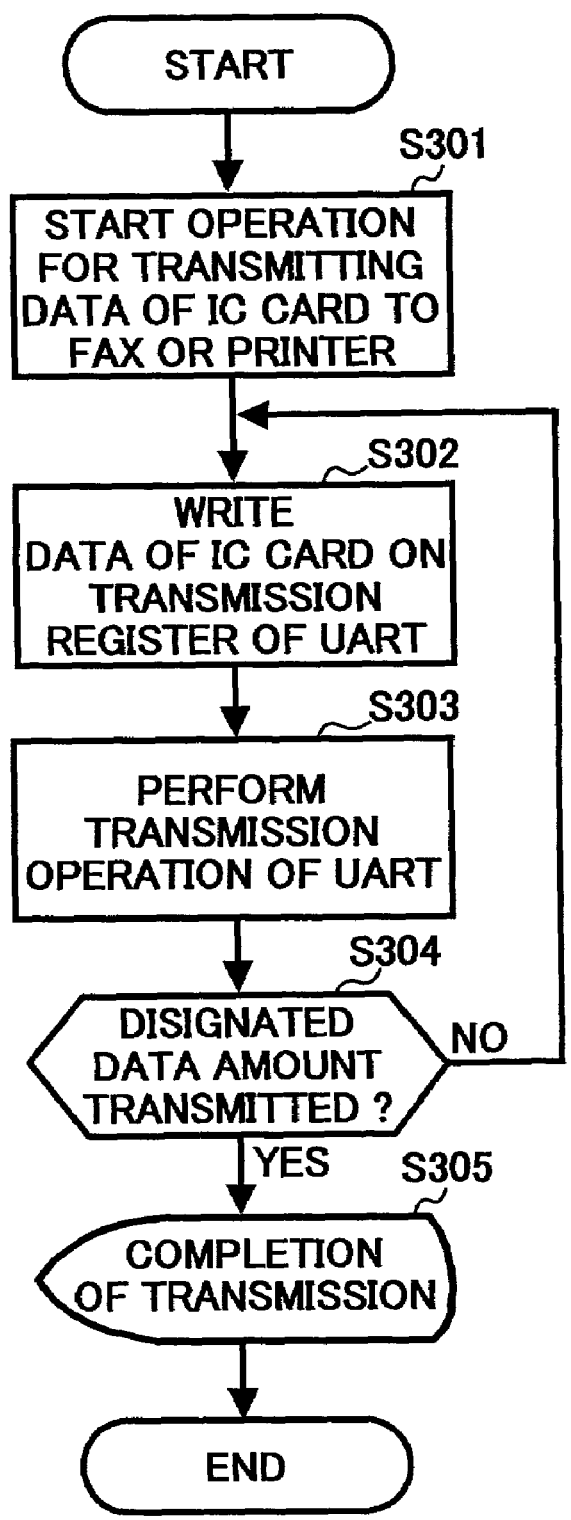
FIG. 5 is a flowchart for explaining an exemplary procedure of the program downloading using a UART configuration for a data transmission between a main controller and optional devices.

In the above procedure of FIG. 4, the program downloading to the optional device is performed through the data transmission configuration that connects the main controller 10 and either the printer controller 20 or the facsimile controller 30 to each other. Such data transmission corresponds to the processes performed in Steps S209 and S210 or Steps S213 and S214. FIG. 5 shows another flowchart in which the data transmission performed in Steps S209 and S210 or Steps S213 and S214 are performed with the UART configuration. It is assumed that, before starting the process of FIG. 5, several operations are performed; the IC card 17 is inserted into the IC card connector 15, the program data is transmitted from the IC card 17, and the program data is stored in the memory of the main controller 10, including the RAM 13.

In Step S301 in FIG. 5, the transmission of the program data to the facsimile controller 30 or the printer controller 20 is started. In Step S302, the program data representing the contents of the IC card 17 is written into a transmission register of the UART 14. In Step S303, the program data written in the register of the UART 14 is sequentially transmitted to the corresponding option device through the UART interface. In Step S304, whether transmission of a designated amount of data is completed is determined by checking the transmitted data between the UARTs. If the transmission is determined as completed in Step S304, a process for terminating the transmission process is performed in Step S305. Then, the process ends.

Generally, exchanges of the control data between the main controller 10 and the printer controller 20 and between the main controller 10 and the facsimile controller 30 are performed with the UART. The transfer rate for the control data transmission with the UART is typically set to a value in a range of from 4,800 bps to 14,400 bps.

In the present embodiment, each of the programs used for the main controller 10, the printer controller 20, and the facsimile controller 30 and which are subjected to be the downloading, typically has a volume of 1 to 2 Mbytes although it depends upon a scale of the system.

As an example, the following case is examined, in which the UART has the conditions of the following 5 items and each of the control programs for the printer controller 20 and the facsimile controller 30 has a volume of 2 Mbytes.

1. Baud rate is 9,600 bps.
2. Start bit is 1 bit.
3. Data bit is 8 bits.
4. Parity bit is odd, 1 bit.
5. Stop bit is 1 bit.

In the above case, transmission of 1-byte data requires a time of approximately 1.146 ms which calculation is made as follows;

number of bits×baud rate=(1+8+1+1)×1/9600≅1.146 ms.

If the transmission is successively executed with no time consumption between data blocks, the transmission of 2-Mbyte data requires a time of approximately 38.2 min which is calculated as follows;

1.146 ms/byte×2 Mbyte≅2292 s≅38.2 min.

This time period may be too long and cannot be a realistic figure for the downloading.

To make it faster, the UART is set to a baud rate faster than the rate normally used for transmitting the control data. As an example, a baud rate of 16 times faster is examined, that is, 9,600 bps is increased to 153,600 bps.

In this case, transmission of 2-Mbyte data requires a time of approximately 2.4 min., which can be considered as realistic as the downloading. The time is calculated as follows;

{(1+8+1+1)×1/153600}s/byte×2 Mbyte ≅143.2 s≅2.4 min.

Figure 6:
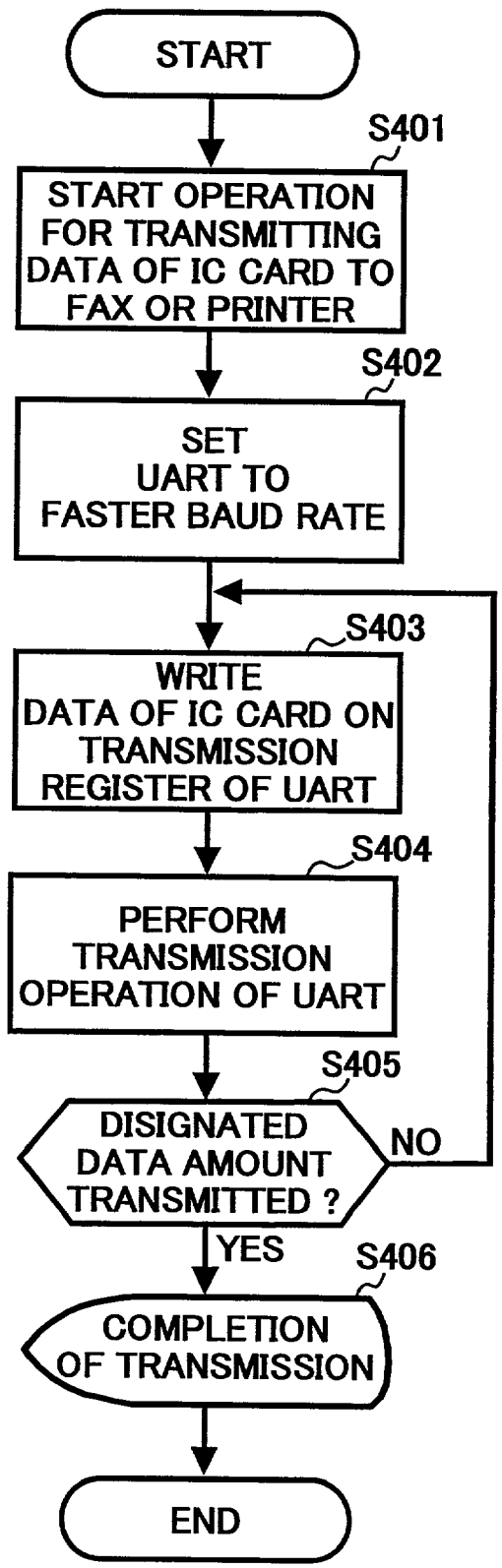
FIG. 6 is a flowchart for explaining another exemplary procedure of the program downloading using the UART configuration for the data transmission between the main controller and the optional devices.

Referring to FIG. 6, an exemplary procedure of the program downloading with a faster UART baud rate is explained. In the program downloading shown in FIG. 6, the downloading of the program is set to a baud rate faster than the one normally used for transmitting the control data with the UART configuration between the main controller 10 and the optional devices (i.e., the printer controller 20 and the facsimile controller 30). FIG. 6 shows the procedure of data transmission between the main controller 10 and the optional devices, which corresponds to Steps S209 and S210 or Steps S213 and S214 of FIG. 4. It is assumed that, before starting the process of FIG. 6, several operations are performed; the IC card 17 is inserted into the IC card connector 15, the program data is transmitted from the IC card 17, and the program data is stored in the memory of the main controller 10, including the RAM 13.

In Step S401 of FIG. 6, the transmission of the program data to the facsimile controller 30 or the printer controller 20 is started. Initially, in Step S402, the UART 14 is set to a baud rate faster than the regular baud rate at which, as regular operations other than the program downloading, the control data is transmitted to the optional devices so as to activate the optional devices. In Step S403, the program data representing the contents of the IC card 17 is written into the transmission register of the UART 14. In Step S404, the program data written in the register of the UART 14 is sequentially transmitted to the corresponding option device through the UART interface. In Step S405, whether transmission of a designated amount of data is completed is determined by checking the transmitted data between the UARTs. If the transmission is determined as completed in Step S405, a process for terminating the transmission process is performed in Step S406. Then, the process ends.

Figure 7:
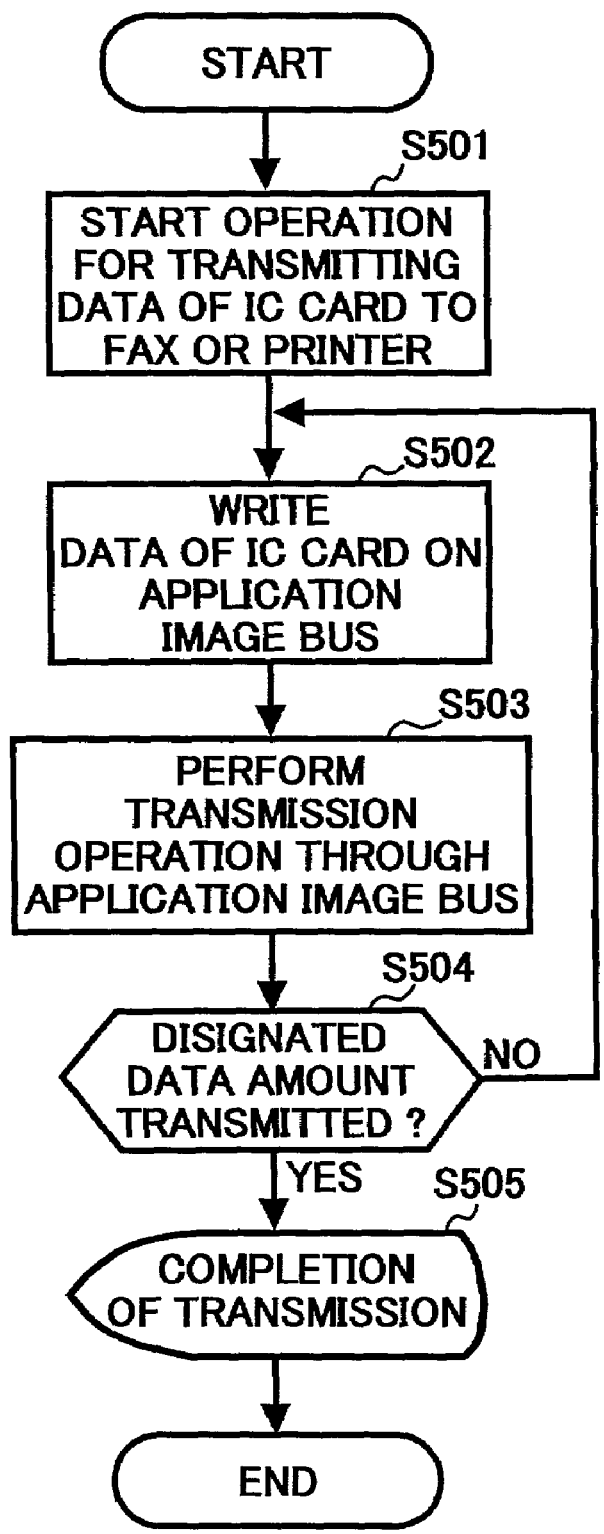
FIG. 7 is a flowchart for explaining an exemplary procedure of the program downloading using an application image data bus configuration for the data transmission between the main controller and the optional devices.

Referring now to FIG. 7, an exemplary procedure of the program downloading through the application image data bus is explained. In the program downloading shown in FIG. 7, the downloading of the program is performed with the application image data bus configuration between the main controller 10 and the optional devices (i.e., the printer controller 20 and the facsimile controller 30), which steps correspond to Steps S209 and S210 or Steps S213 and S214 of FIG. 4. It is assumed that, before starting the process of FIG. 7, several operations are performed; the IC card 17 is inserted into the IC card connector 15, the program data is transmitted from the IC card 17, and the program data is stored in the memory of the main controller 10, including the RAM 13.

In Step S501 of FIG. 7, the transmission of the program to the facsimile controller 30 or the printer controller 20 is started. Initially, in Step S502, the program data stored in the memory of the main controller 10 (i.e., the RAM 13) is written into the image controller 16 using, for example, a transmission buffer included in the image controller 16 so as to transmit the program data through the application image data bus. In Step S503, the program data written in the image controller 16 is sequentially transmitted to the corresponding option device through the application image data bus using, for example, the transmission buffer of the image controller 16. In Step S504, whether transmission of a designated amount of data is completed is determined by checking the transmitted data between the transmission and receiving buffers of the image controllers 16 and 26 and between the transmission and receiving buffers of the image controllers 16 and 36. If the transmission is determined as completed in Step S504, a process for terminating the transmission process is performed in Step S505. Then, the process ends.

In this way, the program downloading is performed through the application image data bus between the main controller 10 of the digital copying apparatus 2 and the optional devices (i.e., the printer controller 20 and the facsimile controller 30). Thereby, the digital multi-function apparatus 1 can perform the program downloading in a relatively faster manner.

The present embodiment is provided with a download program that has predicates of an execution procedure for downloading, from an external storage, programs used as control programs by the CPU 11 of the main controller 10, the image controller 16, the CPU 21 of the printer controller 20, and the CPU 31 of the facsimile controller 30. By initiating this download program, the digital multi-function apparatus 1 can perform the program downloading relative to a focused program. This download program can be recorded in any kind of machine readable medium (i.e., a semi-conductor memory, a floppy disk, etc.) and, therefore, it can be prestored in the ROM 12, 22, or 32 under the control of the CPU 11 and the main controller 16, the CPU 21, or the CPU 31. It may also be possible that the download program is stored in a medium, the program is installed in the RAM 13, 23, or 33, and the download program installed in the RAM 13, 23, or 33 is then initiated to execute the download program.

This invention may be conveniently implemented using a conventional general purpose digital computer programmed according to the teaching of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Numerous additional modifications and variations of the present application are possible in light of the above teachings. It is therefore to be understood that within the scope of the appended claims, the present application may be practiced otherwise than as specifically described herein.

This application claims priority to Japanese patent application No. JPAP2000-132712 filed on May 1, 2000 in the Japanese Patent Office, the entire contents of which are hereby incorporated by reference.

The invention claimed is:

1. A multi-function apparatus, comprising:
a plurality of image forming apparatuses, each comprising its own dedicated controller including a program memory for storing a program used by each of said plurality of image forming apparatuses, respectively;
a buffer memory;
a data transmission mechanism, connected to said buffer memory, configured to connect plural of said plurality of image forming apparatuses to each other so as to allow a data transmission therebetween; and
a connector configured to connect an external storage to said the buffer memory so as to allow a data transmission from said external storage to said buffer memory, said external storage storing data of programs to be respectively used by said plurality of image forming apparatuses,
wherein, when said external storage is connected to said connector, said data of said programs stored in said external storage are transmitted to said buffer memory through said connector and are downloaded into said program memory included in said dedicated controller of each of said plurality of image forming apparatuses, respectively, through a data transmission using said data transmission mechanism.

2. A multi-function apparatus as defined in claim 1, wherein said data transmission mechanism includes a communications mechanism which is normally used by said plurality of image forming apparatuses to exchange control data therebetween.

3. A multi-function apparatus as defined in claim 2, wherein said data of said programs transmitted from said external storage to said buffer memory are downloaded with said communications mechanism to said program memory included in said dedicated controller of each of said plurality of image forming apparatuses, respectively, at a transmission rate faster than a regular transmission rate used for said control data.

4. A multi-function apparatus as defined in claim 2, wherein said communications mechanism comprises a universal asynchronous receiver transmitter.

5. A multi-function apparatus as defined in claim 1, wherein said data transmission mechanism includes an image data bus which is normally used by said plurality of image forming apparatuses to exchange image data therebetween.

6. A multi-function apparatus as defined in claim 1, wherein said plurality of image forming apparatuses includes at least one of a copying apparatus, a printing apparatus, and a facsimile apparatus.

7. A multi-function apparatus, comprising:
a plurality of image forming apparatuses, each comprising its own dedicated controlling means including program memory means for storing a program used by each of said plurality of image forming apparatuses, respectively;
buffer memory means;
data transmission means for connecting said buffer memory means and plural of said plurality of image forming apparatuses to each other so as to allow a data transmission therebetween; and
connecting means for connecting an external storage to said buffer memory means so as to allow a data transmission from said external storage to said buffer memory means, said external storage storing data of programs to be respectively used by said plurality of image forming apparatuses,
wherein, when said external storage is connected to said connecting means, said data of said programs stored in said external storage are transmitted to said buffer memory means through said connecting means and are downloaded into said program memory means included in said dedicated controlling means of each of said plurality of image forming apparatuses, respectively, through a data transmission using said data transmission means.

8. A multi-function apparatus as defined in claim 7, wherein said data transmission means includes a communications mechanism which is normally used by said plurality of image forming apparatuses to exchange control data therebetween.

9. A multi-function apparatus as defined in claim 8, wherein said data of said programs transmitted from said external storage to said buffer memory means are downloaded with said communications mechanism to said program memory means included in said dedicated controlling means of each of said plurality of image forming apparatuses, respectively, at a transmission rate faster than a regular transmission rate used for said control data.

10. A multi-function apparatus as defined in claim 8, wherein said communications mechanism comprises a universal asynchronous receiver transmitter.

11. A multi-function apparatus as defined in claim 7, wherein said data transmission means includes an image data bus which is normally used by said plurality of image forming apparatuses to exchange image data therebetween.

12. A multi-function apparatus as defined in claim 7, wherein said plurality of image forming apparatuses includes at least one of a copying apparatus, a printing apparatus, and a facsimile apparatus.

13. A multi-function image processing apparatus, comprising:
- a plurality of image processing apparatuses, each comprising its own dedicated controller including a program memory for storing a program used by each of said plurality of image processing apparatuses, respectively;
- a buffer memory;
- a data transmission mechanism, connected to said buffer memory, configured to connect plural of said plurality of image processing apparatuses to each other so as to allow a data transmission therebetween; and
- a connector configured to connect an external storage to said buffer memory so as to allow a data transmission from said external storage to said buffer memory, said external storage storing data of programs to be respectively used by said plurality of image processing apparatuses,
- wherein, when said external storage is connected to said connector, said data of said programs stored in said external storage are transmitted to said buffer memory through said connector and are downloaded into said program memory included in said dedicated controller of each of said plurality of image processing apparatuses, respectively, through a data transmission using said data transmission mechanism.

14. A method for program downloading, comprising the steps of:
- providing a multi-function apparatus comprising
  - a buffer memory,
  - a connector, and
  - a plurality of image forming apparatuses, plural of said plurality of image forming apparatuses connected to each other with a data transmission mechanism, each of said plurality of image forming apparatuses including its own dedicated controller provided with a program memory for storing a program used by each of said plurality of image forming apparatuses, respectively;
- connecting an external storage storing data of programs to said connector;
- transmitting said data of programs stored in said external storage into said buffer memory; and
- downloading said data of said programs, transmitted from said external storage to said buffer memory, to said program memory of said dedicated controller included in each of said plurality of image forming apparatuses, respectively, through a data transmission using said data transmission mechanism.

15. A method as defined in claim 14, wherein said downloading step includes using a communications mechanism, said data transmission mechanism including said communications mechanism which is normally used by said plurality of image forming apparatuses to transmit control data therebetween.

16. A method as defined in claim 15, wherein said downloading step includes downloading said data of said programs, transmitted from said external storage to said buffer memory by said transmitting step, with said communications mechanism to said program memory of said dedicated controller included in each of said plurality of image forming apparatuses, respectively, at a transmission rate faster than a regular transmission rate used for said control data.

17. A method as defined in claim 16, wherein said downloading step includes setting said data transmission mechanism to said faster transmission rate.

18. A method as defined in claim 15, wherein said downloading step includes using said communications mechanism which comprises a universal asynchronous receiver transmitter.

19. A method as defined in claim 14, wherein said downloading step includes using said data transmission mechanism which includes an image data bus which is normally used by said plurality of image forming apparatuses to exchange image data therebetween.

20. A method as defined in claim 14, wherein the downloading step includes checking an amount of data transmitted in order to determined whether downloading of said data of programs is completed.

21. A method as defined in claim 14, further comprising:
- selecting at least one of said plurality of image forming apparatuses to which said data of programs is downloaded, wherein said selecting step includes inputting a selection of said at least one of said plurality of image forming apparatuses from at least one of said external storage and an operation panel of said multi-function apparatus.

22. A computer readable medium configured to store computer instructions for execution on a computer system, which when executed by the computer system, cause the computer system to perform the steps recited in any one of claims 14–21.

23. A system comprising:
- a memory device having embodied therein a download program; and
- a processor in communication with the memory device, the processor configured to
- connect to a multi-function apparatus including
  - a buffer memory,
  - a connector, and
  - a plurality of image forming apparatuses, plural of said plurality of image forming apparatuses connected to each other with a data transmission mechanism, each of said plurality of image forming apparatuses including its own dedicated controller provided with a program memory for storing a program used by each of said plurality of image forming apparatuses, respectively,
- connect to an external storage which stores data of programs, said external storage being connected to said connector,
- transmit said data of said programs stored in said external storage into said buffer memory, and
- download said data of said programs, transmitted from said external storage to said buffer memory, to said program memory of said dedicated controller included in each of said plurality of image forming apparatuses, respectively, through a data transmission using said data transmission mechanism.

* * * * *